(12) United States Patent
Okawachi et al.

(10) Patent No.: US 8,435,700 B2
(45) Date of Patent: May 7, 2013

(54) FUEL CELL SYSTEM WITH FUEL TANK LINER, METHOD FOR SUPPLYING FUEL GAS, AND MOBILE BODY

(75) Inventors: Eiji Okawachi, Toyota (JP); Tsukuo Ishitoya, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 0 days.

(21) Appl. No.: 13/509,850

(22) PCT Filed: May 12, 2010

(86) PCT No.: PCT/JP2010/058005
§ 371 (c)(1),
(2), (4) Date: May 15, 2012

(87) PCT Pub. No.: WO2011/142002
PCT Pub. Date: Nov. 17, 2011

(65) Prior Publication Data
US 2013/0052557 A1    Feb. 28, 2013

(51) Int. Cl.
*H01M 8/04*    (2006.01)
*F17C 1/02*    (2006.01)

(52) U.S. Cl.
USPC .......................... 429/515; 220/586; 220/588

(58) Field of Classification Search .................. 220/581, 220/588, 589; 429/444, 515
See application file for complete search history.

(56) References Cited

FOREIGN PATENT DOCUMENTS

| JP | 8-68497 | 3/1996 |
|---|---|---|
| JP | 9-178094 | 7/1997 |
| JP | 10-231998 | 9/1998 |
| JP | 2002-188794 | 7/2002 |
| JP | 2004-127817 | 4/2004 |
| JP | 2005-315367 | 11/2005 |
| JP | 2006-226511 | 8/2006 |

OTHER PUBLICATIONS

International Search Report in International Application No. PCT/JP2010/058005; Mailing Date: Aug. 17, 2010.

*Primary Examiner* — Patrick Ryan
*Assistant Examiner* — Lucas J O Donnell
(74) *Attorney, Agent, or Firm* — Finnegan, Henderson, Farabow, Garrett & Dunner, LLP

(57) ABSTRACT

An object of the present invention is to provide a fuel cell system configured to be able to suppress loads imposed on a liner caused by gas filling, as well as a method for supplying fuel gas in the fuel cell system, and a mobile body. The fuel cell system includes a fuel cell, a tank which includes a liner and a reinforcement layer formed on an outer peripheral surface of the liner and in which fuel gas is stored, an adjustment device configured to adjust a supply amount of fuel gas to be fed from the tank to the fuel cell, an information acquisition section configured to acquire information on a pressure and a temperature in the tank, a calculation section configured to calculate a gap amount between the liner and the reinforcement layer based on information acquired by the information acquisition section during operation of the fuel cell system, and a decision section configured to decide whether or not to limit the supply amount based on the calculated gap amount.

13 Claims, 18 Drawing Sheets

[CASE WHERE EMISSION SPEED IS HIGH]

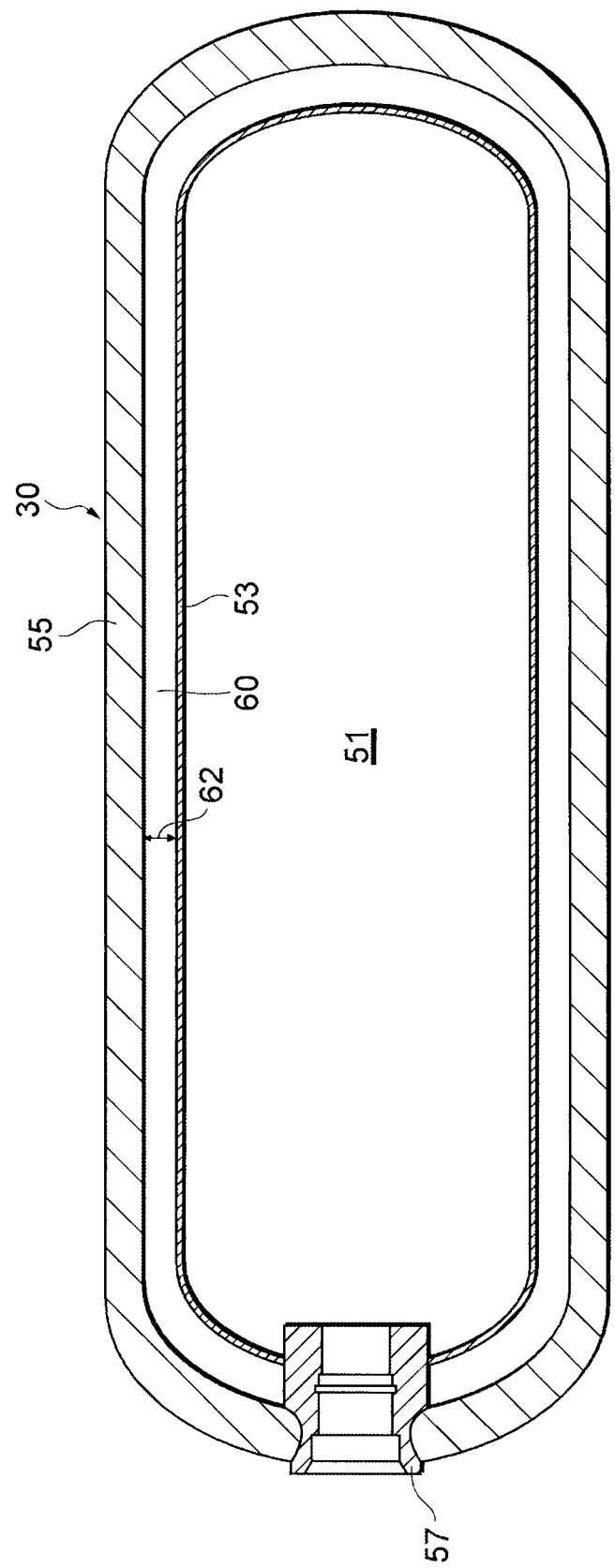

FIG.7

TANK 30

| TANK PRESSURE[MPa] \ TANK TEMPERATURE[°C] | T₁ | T₂ | T₃ | T₄ | T₅ |
|---|---|---|---|---|---|
| 0 | A1 [mm] | A2 LARGE | A3 | A4 | A5 → SMALL |
| 20 | B1 LARGE → | B2 | B3 | B4 | B5 |
| 40 | C1 | C2 | C3 | C4 | C5 |
| 60 | D1 | D2 | D3 | D4 | D5 |
| 80 | E1 SMALL | E2 | E3 | E4 | E5 |

$T_1 < T_2 < T_3 < T_4 < T_5$

M

FUEL CELL SYSTEM WITH FUEL TANK LINER, METHOD FOR SUPPLYING FUEL GAS, AND MOBILE BODY

CROSS-REFERENCE TO RELATED APPLICATIONS

This application is a national phase application of International Application No. PCT/JP2010/058005, filed May 12, 2010, the contents of which are incorporated herein by reference.

TECHNICAL FIELD

The present invention relates to a fuel cell system and the like which include a tank with a liner covered with a reinforcement layer on an outer peripheral surface thereof.

BACKGROUND ART

For example, in a vehicle-mounted fuel cell system, hydrogen gas in a tank is supplied to a fuel cell. In the fuel cell, the hydrogen gas reacts with oxidized gas and is thus consumed. Thus, power is generated and used for driving. If the amount of hydrogen gas remaining in the tank decreases as a result of the consumption, the vehicle stops off at a hydrogen station so as to be filled with hydrogen gas from the hydrogen station.

Here, when hydrogen gas is fed, that is, emitted from the tank, the pressure and temperature in the tank decrease. On the other hand, when hydrogen gas is filled into the tank, the pressure and temperature in the tank increase. Furthermore, a tank of this kind is generally configured such that a gas-impermeable liner is covered, on an outer peripheral surface thereof, with a reinforcement layer offering pressure resistance (see, for example, Patent Document 1). For example, the reinforcement layer is formed of CFRP wound around the outer peripheral surface of the liner by a filament winding method or the like.

CITATION LIST

Patent Document

Patent Document 1: Japanese Patent Laid-Open No. 2006-226511

SUMMARY OF INVENTION

Technical Problem

However, in particular, if a tank is formed of a resin liner, the liner may contract depending on the difference in the coefficient of elasticity or the linear coefficient of expansion between the liner and the CFRP, resulting in a gap between the liner and the CFRP. Furthermore, even if no gap is created in a manufacturing stage, when hydrogen gas is supplied to reduce the pressure and temperature in the tank, the liner may similarly contract to form a gap. The size of the gap tends to increase consistently with decreasing temperature or pressure.

When the tank is filled with hydrogen gas with a gap present between the liner and the CFRP, the filled hydrogen gas causes the contracted liner to expand so as to close the gap. However, a heavy load may be placed on the liner depending on the amount of expansion or the like.

In this regard, to prevent a gap from being formed, a measure for improvement is contemplated in which the liner and the CFRP are bonded together. However, this measure causes the liner to deform locally, thus resulting in a local load. The measure is thus undesirable.

Accordingly, an object of the present invention is to provide a fuel cell system configured to enable a reduction in the load imposed on the liner as a result of the filling of hydrogen gas, as well as a method for supplying fuel gas in the fuel cell system and a mobile body.

SOLUTION TO PROBLEM

To accomplish this object, a fuel cell system of the present invention comprises a fuel cell, a tank for storing fuel gas which comprises a liner and a reinforcement layer formed on an outer peripheral surface of the liner and, an adjustment device configured to adjust a supply amount of fuel gas to be fed from the tank to the fuel cell, an information acquisition section configured to acquire information on a pressure and a temperature in the tank, a calculation section configured to calculate a gap amount between the liner and the reinforcement layer based on information acquired by the information acquisition section during operation of the fuel cell system, and a decision section configured to decide whether or not to limit the supply amount based on the calculated gap amount.

Furthermore, a mobile body according to the present invention comprises the fuel cell system according to the present invention, and the tank is configured such that fuel gas from a gas station located outside the mobile body can be filled.

According to the present invention, the system decides to limit the supply amount depending on the gap amount. Imposing this limitation allows suppression of a decrease in the speeds at which the temperature and pressure in the tank decrease. Thus, an increase in the gap amount is suppressed. This enables a reduction in the amount by which the liner expands when gas is filled into the tank after the operation of the fuel cell system is stopped. Hence, according to the present invention, loads placed on the liner during the gas filling can be reduced by positively limiting the supply amount depending on the gap amount during the operation of the fuel cell system before the gas filling.

Preferably, the calculation section may also calculate a predicted value for the gap amount predicted to be obtained a predetermined time later, based on an amount of variation in the temperature in the tank and an amount of variation in the pressure therein during the operation of the fuel cell system. The decision section may decide whether or not to limit the supply amount also based on the predicted value.

This configuration enables the supply amount to be progressively limited. For example, compared to avoidance of limitation of the supply amount based on the predicted value, the limitation of the supply amount based on the predicted value enables a reduction in a limitation amount by which the supply amount is limited depending on the current gap amount (the value obtained during the operation of the fuel cell system). The present configuration serves to, for example, soothe a user's feeling that the mobile body is not accelerated during acceleration of the mobile body when the demanded power of the fuel cell is high.

Preferably, the fuel cell system according to the present invention may comprise a determination section configured to compare a state quantity for the fuel gas in the tank with a predetermined criterion value and to determine at least one of a shortage of the fuel gas in the tank or a possibility of the shortage, and a display section configured to indicate at least one of the shortage of the fuel gas in the tank or the possibility of the shortage when the determination section has made the determination. The determination section may change the predetermined criterion value based on the calculated gap amount.

According to this configuration, the determination criterion for what is called an out-of-gas condition varies depending on the gap amount. For example, the system is configured such that the out-of-gas condition is determined and displayed earlier when the gap amount is large than when the gap amount is small. This makes the user aware of the need to perform driving so as to reduce the consumption of fuel gas (supply amount). If this serves to limit the supply amount of fuel gas, an increase in gap amount can be suppressed before gas filling.

More preferably, the state quantity may be the pressure or the amount of fuel gas in the tank. Furthermore, preferably, the determination section calculates the fuel gas amount based on information on the pressure and temperature in the tank acquired by the information acquisition section during the operation of the fuel cell system.

According to this configuration, the information acquired by the information acquisition section can be utilized not only to calculate the gap amount but also to determine the out-of-gas condition.

More preferably, the determination section may change a predetermined criterion value for the pressure or the fuel gas amount to a higher pressure side or a larger amount side when an elongation of the liner needed to zero the calculated gap amount is greater than a predetermined threshold compared to when the elongation is not greater than the predetermined threshold, provided that the temperature in the tank is at least lower than 0° C.

Preferably, the decision section may calculate the elongation of the liner needed to zero the calculated gap amount, and decide to limit the supply amount when the calculated elongation is greater than a predetermined threshold compared to when the calculated elongation is not greater than the predetermined threshold.

Thus, whether or not to limit the supply amount is decided based on the elongation (distortion) of the liner, related to deformation of the liner. Consequently, the need for the limitation can be accurately determined.

More preferably, breaking elongation of the liner may be used for the predetermined threshold. The value of the elongation may vary depending on the temperature in the tank.

According to this configuration, when whether or not to limit the supply amount is decided, the dependence of the breaking elongation on the temperature is taken into account. Thus, the determination can be more accurately made.

Preferably, when the decision section decides to limit the supply amount, the adjustment device may limit the supply amount by carrying out one of zeroing of the supply amount, reduction of a maximum value of a supply flow rate of fuel gas to be supplied to the fuel cell, and reduction of the supply flow rate.

To accomplish the above-described object, a fuel cell system in a method for supplying fuel gas in the fuel cell system according to the present invention comprises a tank including a liner and a reinforcement layer formed on an outer peripheral surface of the liner, and a fuel cell to which fuel gas from the tank is supplied. The method for supplying fuel gas to the fuel cell system comprises the steps of calculating a gap amount between the liner and the reinforcement layer based on information on a pressure and a temperature in the tank acquired during operation of the fuel cell system, determining whether or not an elongation of the liner needed to zero the calculated gap amount is greater than a predetermined threshold, and limiting a supply amount of fuel gas to be fed from the tank to the fuel cell when the elongation is determined to be greater than the threshold compared to when the elongation is not determined to be greater than the threshold.

According to the present invention, in a stage of supplying fuel gas before filling, the supply amount is positively limited when the elongation of the liner needed for the gap amount is greater than the predetermined threshold. This suppresses an increase in gap amount to allow the liner to be restrained from undergoing loads during the subsequent gas filling.

BRIEF DESCRIPTION OF THE DRAWINGS

FIG. 5 is a cross-sectional view showing that a gap is present between a liner and a reinforcement layer in the tank in FIG. 3.

FIG. 7 is a diagram showing an example of a map for the amount of the gap in the tank according to the embodiment.

EMBODIMENTS FOR CARRYING OUT THE INVENTION

A fuel cell system according to a preferred embodiment of the present invention will be described hereinafter with reference to the accompanying drawings. In an example described below, the fuel cell system is mounted in a vehicle that is a typical example of a mobile body.

1. Summary of the Vehicle

Figure 1:
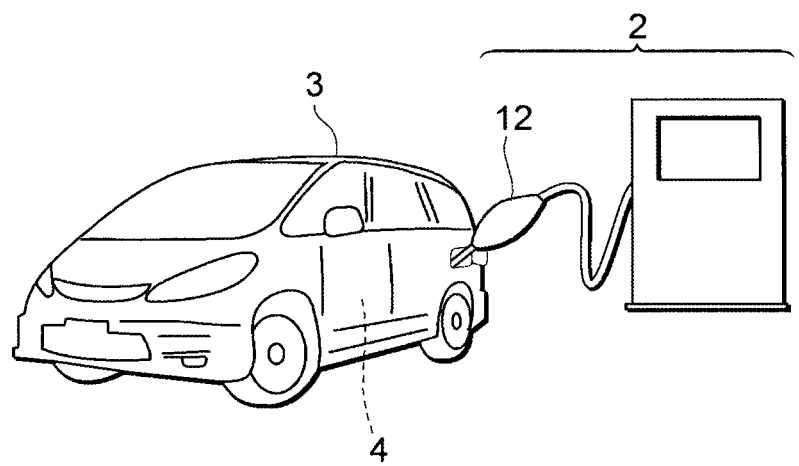
FIG. 1 is a diagram showing a vehicle with a fuel cell system according to an embodiment mounted therein together with a gas station.

As shown in FIG. 1, for example, at a hydrogen station 2 serving as a gas station, hydrogen gas is filled into a tank in a vehicle 3 through a filling nozzle 12 of the hydrogen station 2. The vehicle 3 includes a fuel cell system 4 mounted therein to supply power to a traction motor that is a driving source.

Figure 2:
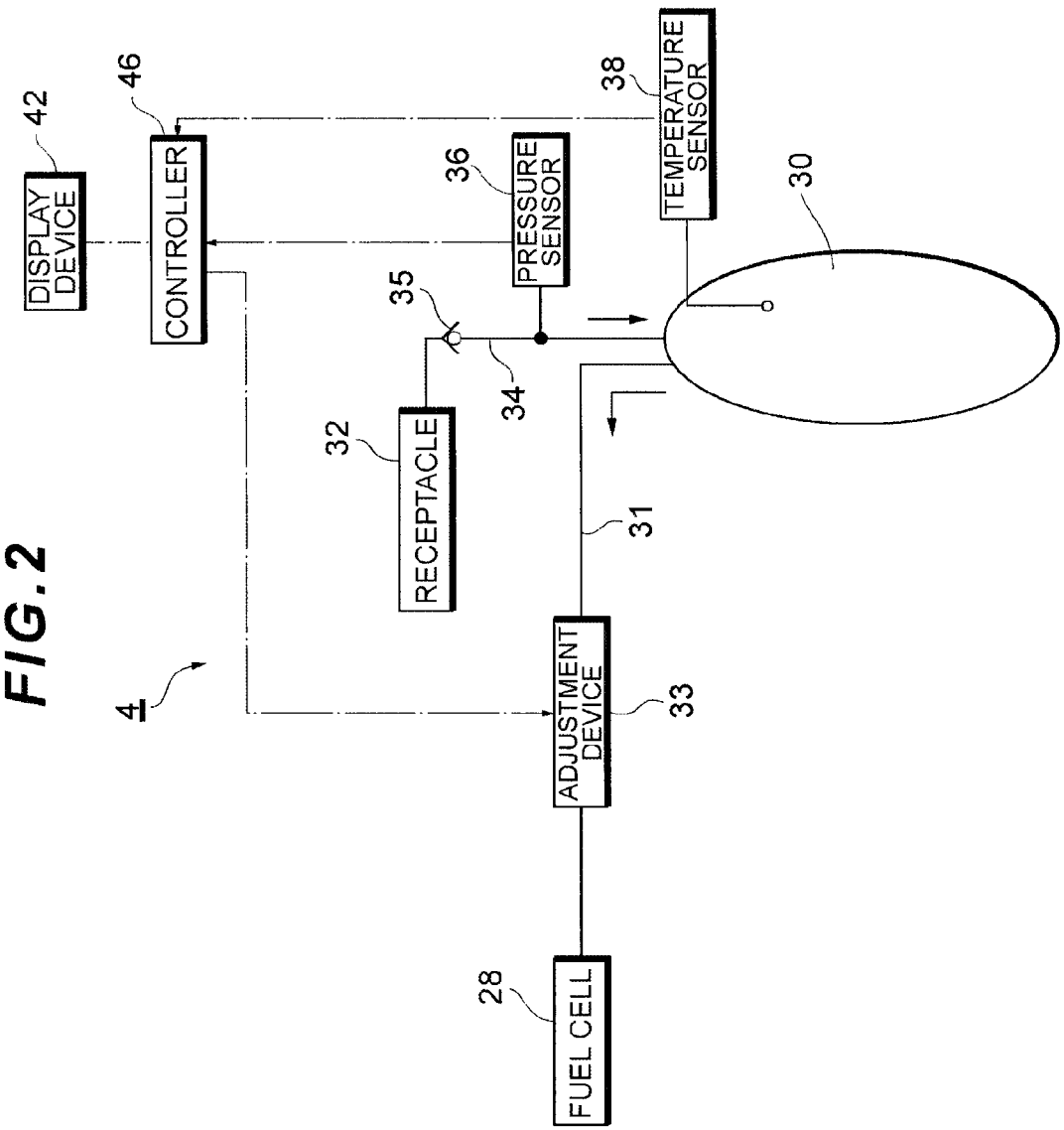
FIG. 2 is a diagram of configuration of the fuel cell system according to the embodiment.

As shown in FIG. 2, the fuel cell system 4 includes a fuel cell 28 and a tank 30.

The fuel cell 28 is formed of, for example, a solid polymer electrolyte and has a stack structure in which a large number of single cells are stacked. The fuel cell 28 generates power based on electrochemical reaction between fuel gas (for example, hydrogen gas) and oxidation gas (for example, air). In the example described below, the fuel gas is hydrogen gas.

The tank 30 is a high-pressure tank serving as a source from which hydrogen is supplied to the fuel cell 28 and in which for example, 35 MPa or 70 MPa of hydrogen gas can be stored. If a plurality of tanks 30 are mounted, the tanks 30 are connected together in parallel with the fuel cell 28.

A supply system from the tank 30 to the fuel cell 28 includes a supply line 31 and an adjustment device 33 provided in the supply line 31. The supply line 31 joins the tank 30 and the fuel cell 28 together. The adjustment device 33 adjusts the supply amount of hydrogen gas to be fed from the tank 30 to the fuel cell 28. The adjustment device 33 can be formed of at least one of a shutoff valve, a regulator, a flow control valve, and an injector. The shutoff valve can also function as an origin valve of the tank 30 to permit and shut off the supply of hydrogen gas to the fuel cell 28. The regulator, the flow control valve, or the injector allows the flow rate of hydrogen gas flowing to the fuel cell 28 to be adjusted. Such an adjustment device 33 enables limitation of the supply amount of hydrogen gas fed to the fuel cell 28.

A system for filling hydrogen gas into the tank 30 includes a receptacle 32 and a filling channel 34. The receptacle 32 is connected to the filling nozzle 12 when the tank 30 is to be filled with hydrogen gas. The filling channel 34 joins the receptacle 32 and the tank 30 together. A check valve 35 is provided in the middle of the filling channel 34 to prevent the reverse flow of hydrogen gas.

The fuel cell system 4 further includes a pressure sensor 36, a temperature sensor 38, a display device 42, and a controller 46.

The pressure sensor 36 detects a pressure substantially reflecting the pressure of hydrogen gas inside the tank 30 (the pressure is hereinafter referred to as a "tank pressure"). The pressure sensor 36 is provided, for example, in the filling channel 34, located downstream of the check valve 35 and immediately before the tank 30. However, the pressure sensor 36 may be arranged inside the tank 30. The temperature sensor 38 detects a temperature reflecting the temperature inside the tank 30 (the temperature is hereinafter referred to as a "tank temperature"). The temperature sensor 38 may be provided inside the tank 30. The display device 42 can also be used, for example, as a part of a car navigation system and displays various types of information on a screen.

The controller 46 is formed as a microcomputer containing a CPU, a ROM, and a RAM and controls the vehicle 3 and the fuel cell system 4. The CPU performs desired calculations in accordance with control programs, and carries out various processes and control operations. The ROM is configured to store control programs and control data to be processed by the CPU. The RAM is used as various work areas mainly for control processes. The controller 46 is connected to the adjustment device 33, the pressure sensor 36, the temperature sensor 38, the display device 42, and the like. For example, the controller 46 controls the adjustment device 33 and thus the supply amount of hydrogen gas based on the information on the pressure and the temperature acquired by the pressure sensor 36 and the temperature sensor 38, both serving as an information acquisition section.

2. Structure of the Tank

Figure 3:
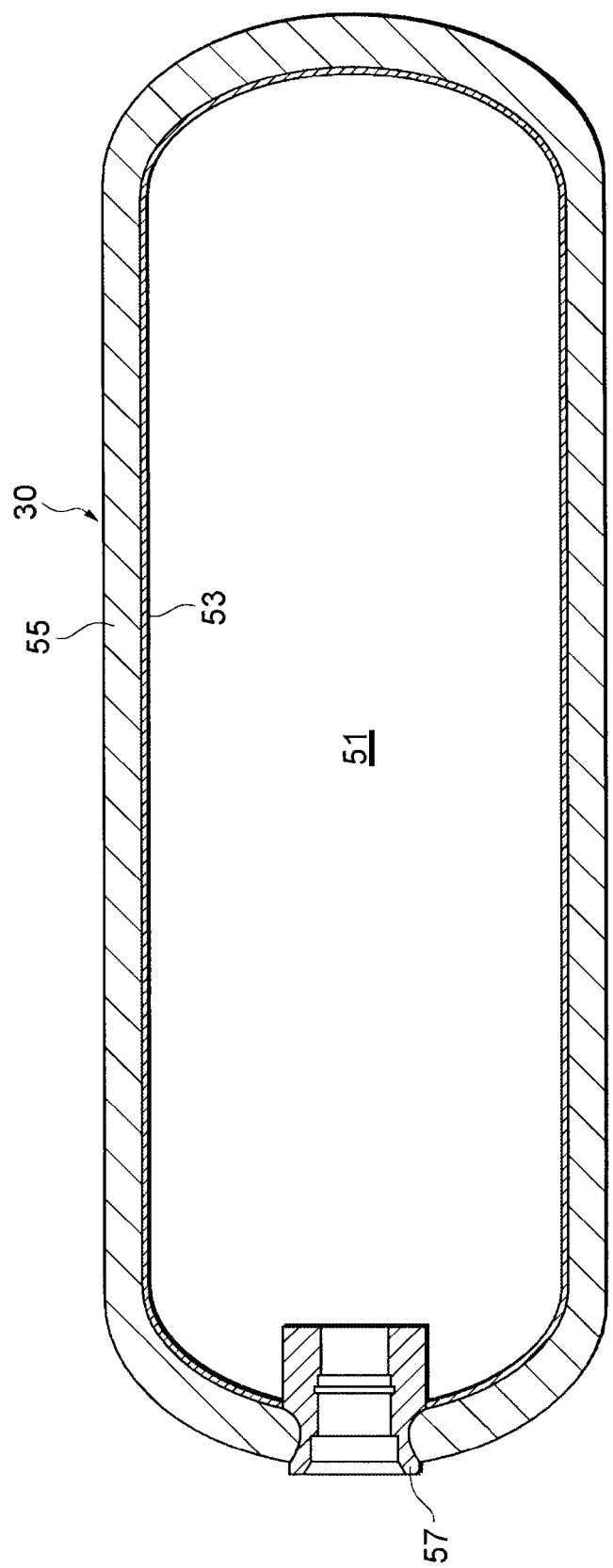
FIG. 3 is a cross-sectional view of a tank according to the embodiment.

As shown in FIG. 3, the tank 30 comprises a liner 53 formed to be hollow so as to define a storage space 51 inside the tank 30, and a reinforcement layer 55 covering an outer peripheral surface of the liner 53. A ferrule 57 to which a valve assembly is connected is provided at least at one end of the liner 53 and the reinforcement layer 55 in the axial direction thereof.

The liner 53 has a gas barrier property to suppress transmission of hydrogen gas to the exterior. A material for the liner is not particularly limited and may be, for example, metal or a hard resin such as a polyethylene resin or a polypropylene resin.

The reinforcement layer 55 serves to withstand the pressure of the stored hydrogen gas. The reinforcement layer 55 is formed by winding fiber impregnated with a matrix resin around an outer surface of the liner 53 and then heating and curing the matrix resin. The matrix resin used may be an epoxy resin, a modified epoxy resin, or the like. The fiber used may be carbon fiber or aramid fiber. Furthermore, examples of a winding method include a filament winding method (FW method) and a tape winding method. Examples of a manner of winding in this case include well-known hoop winding and helical winding.

In the present embodiment, the reinforcement layer 55 of CFRP (Carbon Fiber Reinforced Plastics) is formed by using the FW method for the liner 53 of a resin. For the CFRP, a thermosetting epoxy resin is used as the matrix resin, and carbon fiber is used as the fiber. The reinforcement layer 55 may include a layer other than the CFRP layer stacked on the outer peripheral surface of the liner 53, for example, a GFRP (Glass Fiber Reinforced Plastics) layer stacked on the outer peripheral surface of the CFRP layer.

Figure 4A:
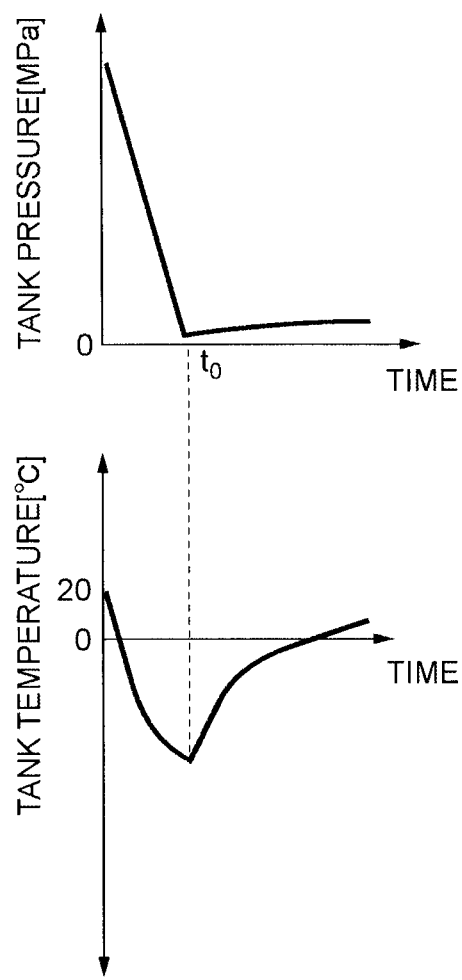
FIG. 4A is a diagram illustrating temporal variations in tank pressure and tank temperature observed when the ambient temperature is 20° C., wherein hydrogen gas is emitted from the tank at a low speed.
Figure 4B:
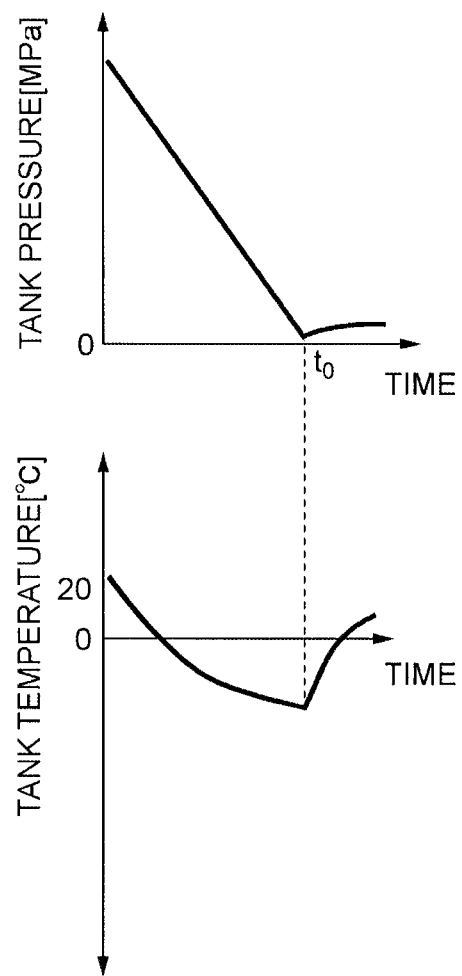
FIG. 4B is a diagram illustrating temporal variations in tank pressure and tank temperature observed when the ambient temperature is 20° C., wherein hydrogen gas is emitted from the tank at a high speed.

3. Relationship Between Hydrogen Emission Speed and Both Tank Pressure and Tank Temperature FIGS. 4A and 4B are diagrams illustrating temporal variations in the tank pressure and the tank temperature observed when the ambient temperature is 20° C. FIG. 4A relates to a low hydrogen gas emission speed. FIG. 4B relates to a high hydrogen gas emission speed. As is apparent from FIGS. 4A and 4B, the rate of decrease in tank pressure and tank temperature increase consistently with the speed at which hydrogen gas is emitted from the tank 30 (the speed at which hydrogen gas is supplied to the fuel cell 28). After the emission of hydrogen gas is finished (time $t_0$), the tank temperature is raised by the outside air to approach the ambient temperature (20° C.). At this time, the tank pressure slightly rises. In general, when the ambient temperature is low, the tank temperature further lowers.

The tank 30 mounted in the vehicle 3 can be filled by the hydrogen station 2 immediately after the emission of hydrogen gas. Thus, it is expected that in most cases, when hydrogen gas is filled into the tank 30, the tank temperature and the tank pressure have been lowered. At this time, when gas is filled into the tank immediately after driving with a high hydrogen emission speed (for example, accelerated driving), the tank temperature and the tank pressure have been more sharply lowered.

When the tank 30 is specified to contain a reduced amount of hydrogen gas (to have a reduced tank volume), the speed of decrease in tank pressure increases if the amount of hydrogen gas consumed is the same as that in the tank specified to contain the original amount of the hydrogen gas. Thus, in the tank specified to contain a reduced amount of hydrogen gas (to have a reduced tank volume), the tank temperature is likely to lower more sharply.

4. Formation of a Gap

FIG. 5 is a cross-sectional view showing that a gap 60 is present between the liner 53 and the reinforcement layer 55 in the tank 30. The reason for the formation of the gap 60 will be explained.

First, in a process of manufacturing the tank 30 as described below, the gap 60 is formed. Specifically, when the reinforcement layer 55 is formed, carbon fiber impregnated with an epoxy resin is wound, by the FW method, around the liner 53 maintained at the room temperature and at an internal pressure at which the liner does not deform under tension exerted in connection with the FW method. When the winding is finished, the gap 60 has not been formed. In the subsequent stage, the carbon fiber is heated with the internal pressure maintained to harden the epoxy resin in the CFRP by the thermosetting process. Even in this stage, the gap 60 is not formed. However, after the thermosetting process, when the internal pressure is released and the liner 53 returns to the room temperature, the liner 53 contracts. As a result, such a gap 60 as shown in FIG. 5 is formed. This is because the liner 53 is more likely to deform contractively and expansively than the reinforcement layer 55 as a result of a difference in the coefficient of elasticity and the linear coefficient of expansion between the liner 53 and the reinforcement layer 55.

Second, even if the gap 60 is not formed in the above-described manufacturing stage, the gap 60 can be formed when a reduced pressure condition or a reduced temperature condition is established. For example, when the tank pressure lowers while the gap is zero as shown in FIG. 3, such a gap 60 as shown in FIG. 5 is formed. This is because as a result of the difference in the coefficient of elasticity, the liner 53 contracts but the reinforcement layer 55 does not substantially deform. Similarly, when the tank temperature lowers while the gap is zero as shown in FIG. 3, such a gap 60 as shown in FIG. 5 is formed. The size of the gap 60 increases with decreasing tank pressure or tank temperature. That is, the size of the gap 60 tends to increase consistently with the hydrogen gas emission speed (see FIGS. 4A and 4B).

Figure 6:
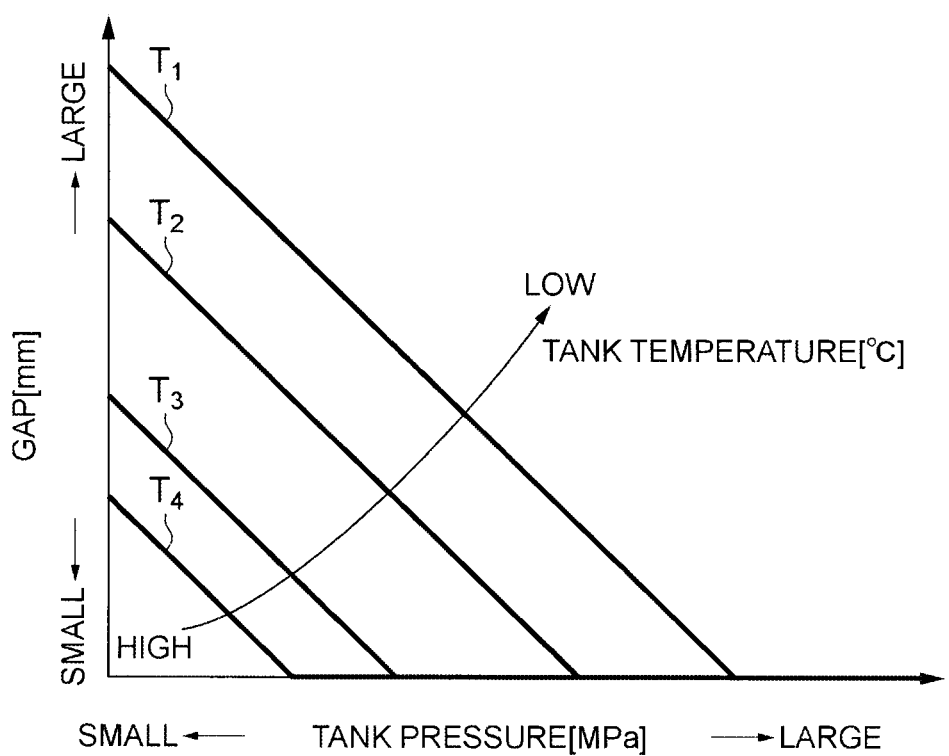
FIG. 6 is a diagram schematically illustrating the relationship between the size of the gap and the tank pressure for a plurality of tank temperatures.

FIG. 6 is a diagram schematically illustrating the relationship between the size of the gap 60 and the tank pressure for a plurality of tank temperatures $T_1$ to $T_4$ ($T_1 < T_2 < T_3 < T_4$).

As shown in FIG. 6, at the same tank temperature, the size of the gap 60 decreases with increasing tank pressure. Similarly, at the same tank pressure, the size of the gap 60 decreases with increasing tank temperature. Hence, FIG. 6 indicates that even if the tank 30 is not filled with hydrogen gas, an increase in tank temperature caused by the ambient temperature reduces the size of the gap 60. FIG. 6 also indicates that with the size of the gap 60 unchanged, the tank pressure required to close the gap 60 increases with decreasing tank temperature.

5. Measurement and Storage of the Gap Amount

The size of the gap 60 varies depending not only on the tank pressure and the tank temperature but also on the specification of the tank 30. For example, the size of the gap 60 varies depending on the materials forming the tank 30 (the materials of the liner 53 and the reinforcement layer 55) and the physical size of the tank 30 (the length, diameter, volume, and the like of the tank 30).

Here, as an index indicative of the size of the gap 60, a gap amount 62 is used which corresponds to the distance between the liner 53 and the reinforcement layer 55 as shown in FIG. 5. If the gap amount 62 is uniform all over the liner 53 and the reinforcement layer 55, the gap amount 62 corresponds to the distance between the liner 53 and the reinforcement layer 55. If the gap amount 62 is not uniform, the gap amount 62 corresponds to the longest distance between the liner 53 and the reinforcement layer 55.

The gap amount 62 can be measured by various methods. For example, the gap amount 62 between the liner 53 and the reinforcement layer 55 can be measured by taking an x-ray of the tank 30 to visualize the inside of the tank 30. Alternatively, the gap amount 62 may be mechanically measured by forming a hole in the reinforcement layer 55 of the tank 30 and inserting a measurement probe of a displacement gauge through the hole. Such measurement of the gap amount 62 is carried out in a development stage for the tank 30. The gap amount 62 is not measured during gas filling by the above-described method. Thus, for the fuel cell system 4, the gap amount 62 of the tank 30 is already known and prepared, for example, in the form of a map.

FIG. 7 is a diagram showing an example of a map M for the gap amount 62.

The map M prepared is specific to the tank 30 of the fuel cell system 4. As described above, the gap amount 62 varies depending on the tank pressure and the tank temperature. Thus, in the map M for the gap amount 62, the axis of ordinate indicates the tank pressure, and the axis of abscissas indicates the tank temperature. The gap amount is specified in association with each condition. For example, at a tank temperature T1, the gap amount 62, denoted by B1 to E1 in FIG. 7, decreases with increasing tank pressure. Furthermore, at a tank pressure of 0 MPa, the gap amount 62, denoted by A2 to A5 in FIG. 7, decreases with increasing tank temperature.

Here, the map M is stored in a storage section (such as a ROM) of the controller 46. As described in detail below, during the supply of hydrogen gas, the gap amount 62 is calculated by referencing the current tank pressure and tank temperature in the map M in the storage section. Then, based on the gap amount 62, the controller 46 determines whether or not to impose a limitation on the subsequent supply amount.

6. GAP Determining Value

Figure 8:
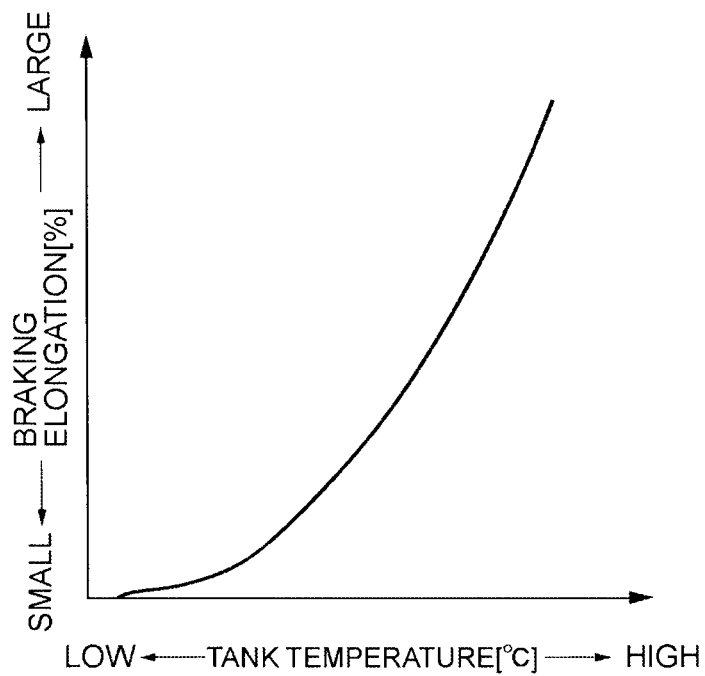
FIG. 8 is a diagram illustrating the relationship between the tank temperature and breaking elongation of the liner.

A GAP determining value is an index used for supply control with the gap amount taken into account described below in "7." (see, for example, step S3 in FIG. 11). The GAP determining value means the breaking elongation δ of the liner 53 or the breaking elongation δ of the liner 53 multiplied by a safety factor. The breaking elongation δ is determined by the physical properties of the material of the liner 53 and varies depending on the tank temperature. Specifically, as shown in FIG. 8, the breaking elongation δ increases consistently with the tank temperature. The GAP determining value for the tank 30 is pre-stored in the storage section of the controller 46 similarly to the map M.

The breaking elongation δ can be obtained based on the results of tension tests. The breaking elongation δ is of course expressed by:

$$\delta = 100 \times (l_f - l_0)/l_0 \qquad (1)$$

where the meanings of the parameters are as follows:
$l_0$: the initial length of the liner 53, and
$l_f$: the permanent elongation of the liner 53 after breakage.
6-1. Target to be Compared with the Gap Determining Value In the supply control described below in "7.", a target to be compared with the GAP determining value is the elongation ε of the liner 53 required to close the gap 60.

Figure 9A:
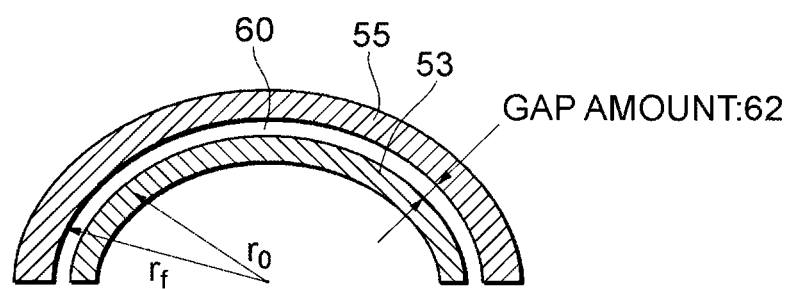
FIG. 9A is a diagram illustrating a method for calculating elongation of the liner required to close the gap, wherein the gap is present.
Figure 9B:
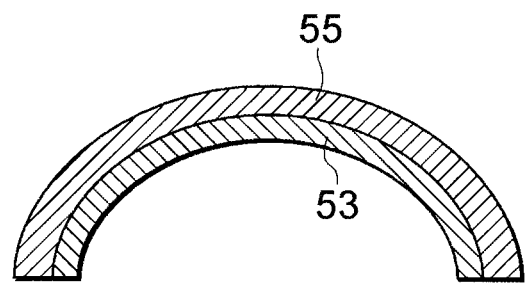
FIG. 9B is a diagram illustrating the method for calculating elongation of the liner required to close the gap, wherein the gap has been eliminated.

As shown in FIG. 9A, when hydrogen gas is filled into the tank with the gap 60 present between the liner 53 and the reinforcement layer 55, the liner 53 deforms expansively until the liner 53 closes the gap 60 as shown in FIG. 9B. This is because the filling of hydrogen gas serves to raise the tank pressure and the tank temperature, causing the contracted liner 53 to expand until the liner 53 comes into contact with the reinforcement layer 55. The elongation of the liner 53 with respect to the gap 60, that is, the elongation ε of the liner 53 required to close the gap 60, is calculated, for example, using:

$$\epsilon = 100 \times (r_f - r_0)/r_0 \qquad (2)$$

where the meanings of the parameters are as follows:
$r_0$: the initial outer diameter of the liner 53, and
$r_f$: the outer diameter of the liner 53 obtained when the gap 60 is closed.

By way of example, for $r_0=50$ mm and a gap amount of 5 mm, $r_f=55$. Thus, the required elongation ε of the liner 53 is 10%.

For the supply control, the calculated value of the gap amount 62 and the outer diameter $r_f$ of the liner 53 are known. Thus, the elongation ε required to close the gap 60 can be calculated based on Expression (2) described above. Then, the calculated required elongation ε is compared with the GAP determining value. If the required elongation ε is greater than the GAP determining value, a load equal to or greater than an allowable value is expected to be imposed on the liner 53 during gas filling after the fuel cell system 4 is stopped.

Figure 10:
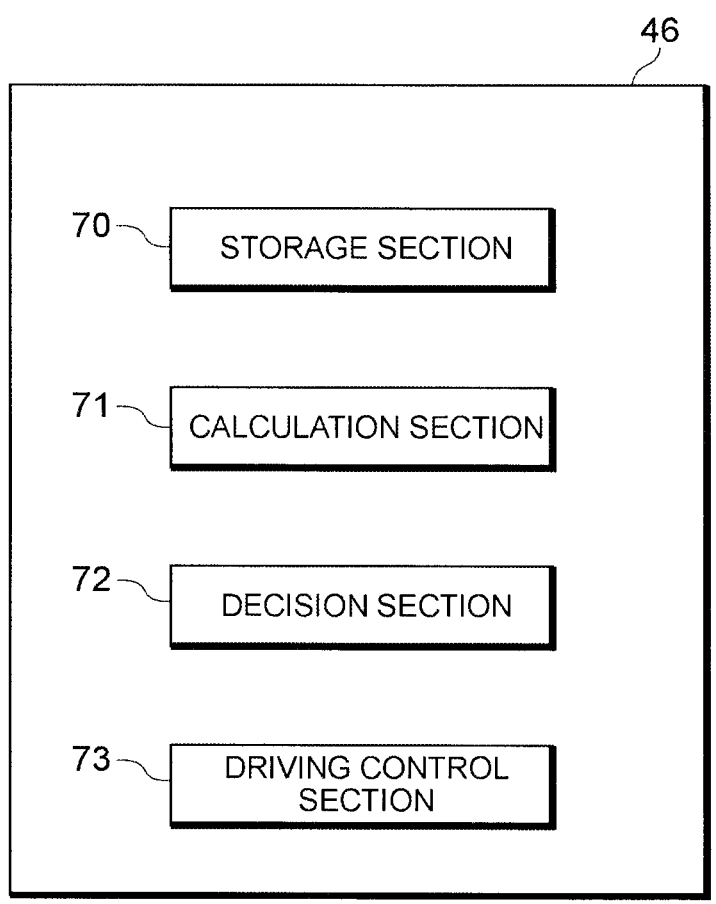
FIG. 10 is a diagram of functional blocks for implementing a first example of control in the fuel cell system according to the embodiment.

Here, the GAP determining value (predetermined threshold) to be compared with the calculated required elongation ε corresponds to the tank temperature measured during the comparison. This is because the breaking elongation δ depends on the tank temperature as described above (see FIG. 8). Thus, the GAP determining value to be set increases with increasing tank temperature.
7. Supply Control with the Gap Amount Taken into Account Now, the supply of hydrogen gas carried out in the fuel cell system 4 will be described with reference to a plurality of examples of control with the gap amount 62 taken into account. In each of the examples, control is performed during operation of the fuel cell system 4.
7-1. First Example of Control FIG. 10 is a block diagram showing the functional blocks of the controller 46. The controller 46 includes a storage section 70, a calculation section 71, a decision section 72, and a driving control section 73. The storage section 70 is configured to store the above-described map M and GAP determining value corresponding to the tank 30. The calculation section 71 calculates the gap amount 62 by referencing the detected tank pressure and tank temperature in the map M in the storage section 70. Based on the calculated gap amount 62, the decision section 72 decides whether or not to limit the supply amount of hydrogen gas to be supplied to the fuel cell 28. The driving control section 73 controls the adjustment device 33 based on the result of the decision by the decision section 72. In particular, if the decision section 72 decides to limit the supply amount, the driving control section 73 controls the adjustment device 33 so that the supply amount is adjusted in accordance with the decided limitation.

Figure 11:
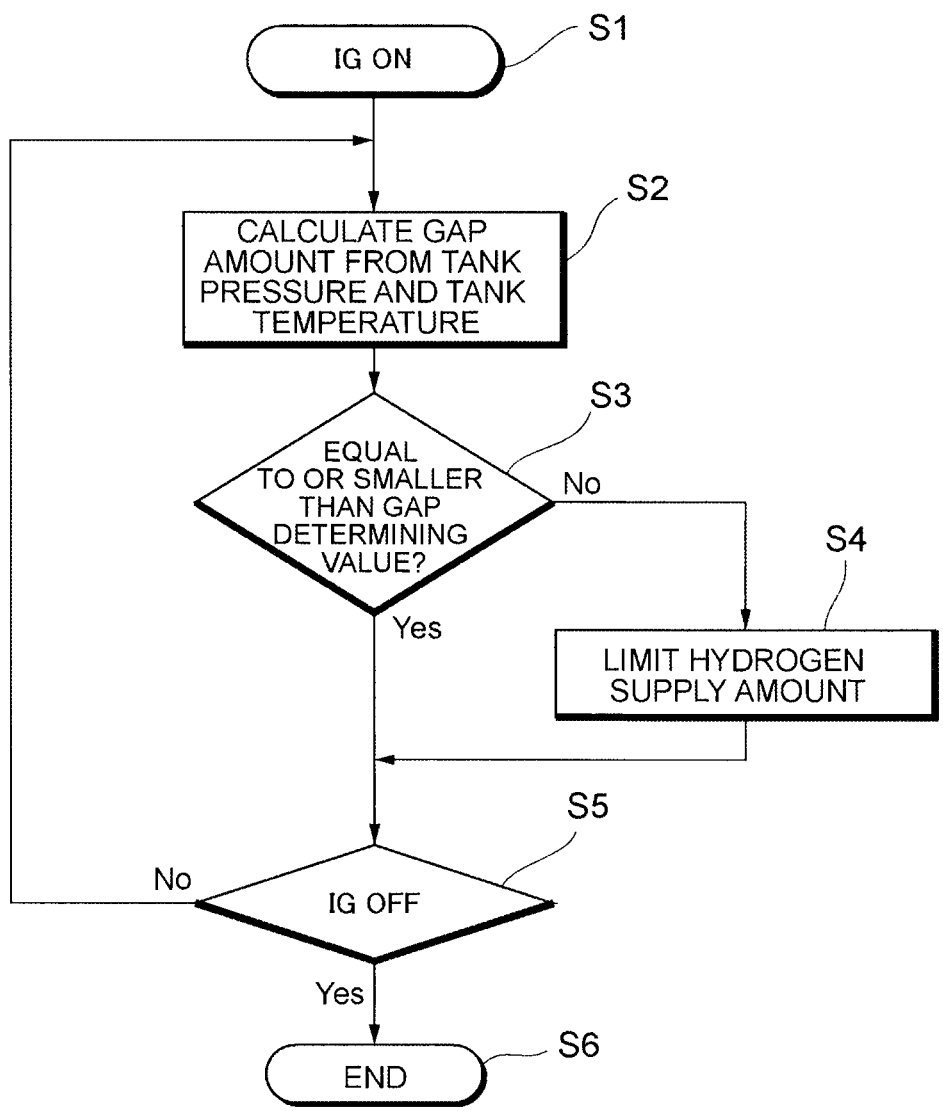
FIG. 11 is a flowchart illustrating the first example of control in the fuel cell system according to the embodiment.

FIG. 11 is a flowchart illustrating an example of the present control.

First, a user such as a driver turns on an ignition key to a vehicle 3 (step S1). Then, the fuel cell system 4 starts to operate. Thus, hydrogen gas from the tank 30 starts to be supplied to the fuel cell 28. During the supply of hydrogen gas, the tank pressure and the tank temperature are read into the pressure sensor 36 and the temperature sensor 38, respectively. The gap amount 62 obtained when the tank pressure and the tank temperature are read into the sensors (that is, the current gap amount 62) is calculated (step S2). Specifically, the information on the tank pressure and the tank temperature is temporarily stored in, for example, the RAM of the controller 46. Hence, the calculation section 71 calculates the current gap amount 62 by referencing the temporarily stored information the map M in the storage section 70.

In the next step S3, the decision section 72 calculates the elongation ε of the liner 53 required to close the gap 60 based on the calculated current gap amount 62. The decision section 72 decides whether or not the calculated required elongation ε is equal to or smaller than the GAP determining value. At this time, the GAP determining value to be compared with the calculated required elongation ε corresponds to the current tank temperature read into the sensor in step S2.

As a result, if the calculated required elongation ε is equal to or smaller than the GAP determining value (step S3; Yes), the controller determines that a load equal to or greater than an allowable value is prevented from being imposed on the liner 53 even when hydrogen gas is filled into the tank after the operation of the fuel cell system 4 is stopped, and carries out normal supply of hydrogen gas. During this normal supply of hydrogen gas, the supply of hydrogen gas corresponds to the demanded power of the fuel cell 28. Specifically, the adjustment device 33 allows hydrogen gas at a supply pressure and a supply flow rate and in a supply amount corresponding to the demanded power of the fuel cell 28 to be supplied to the fuel cell 28.

On the other hand, if the calculated required elongation ε is not equal to or smaller than the GAP determining value (step S3; No), the controller determines that a load equal to or greater than the allowable value is imposed on the liner 53 if the normal supply of hydrogen gas is carried out. The controller then limits the supply amount of hydrogen gas (step S4). The limitation of the supply amount refers to limiting the supply amount of hydrogen gas emitted from the tank 30 more strictly than in the normal supply of hydrogen gas.

The supply amount of hydrogen gas can be limited out by several methods under the control of the adjustment device 33. For example, the supply amount can be limited by using a supply flow rate of hydrogen gas obtained by reducing the supply flow rate of hydrogen gas for the normal supply (for example, reducing the supply flow rate by a predetermined percentage). This method can be carried out by repeatedly opening and closing the adjustment device 33 not only when the adjustment device 33 is an injector or the like but also when the adjustment device 33 is a shutoff valve. Alternatively, the supply amount can be limited by reducing the maximum value of the supply amount (for example, setting the maximum flow rate equal to or lower than a predetermined value). These methods allow hydrogen gas to be continuously fed from the tank 30 to the fuel cell 28.

Alternatively, the supply amount may be limited by stopping the supply of hydrogen gas to zero the supply amount. This can be easily carried out when the adjustment device 33 is a shutoff valve. In this case, no hydrogen gas is fed from the tank 30 to the fuel cell 28. In fact, even when this method is adopted, if the fuel cell system 4 includes a hydrogen gas circulation system (which is well known and is thus not shown in the drawings), the fuel cell 28 is allowed to be supplied, by a hydrogen pump, with hydrogen gas or hydrogen off gas contained in the hydrogen gas circulation system.

Thereafter, the above-described steps S2 to S4 are repeated until the user turns off the ignition key to the vehicle 3 (step S5; No). That is, the tank pressure and the tank temperature are read into the sensors as required, and the current gap amount 62 is calculated (step S2). The controller then determines whether or not the required elongation is equal to or smaller than the GAP determining value (step S3). As a result, the supply amount continues to be limited (step S3; No, step S4) or the limitation of the supply amount is cancelled to allow for the normal supply of hydrogen gas (step S3; Yes). When the ignition key to the vehicle is turned off (step S5; Yes), the operation of the fuel cell system 4 ends. The supply of hydrogen gas from the tank 30 to the fuel cell 28 is also stopped (step S6).

The advantageous effects of the above-described present example of control will be described.

The amount 62 of the gap in the tank 30 is calculated during the operation of the fuel cell system 4. The controller then determines whether or not a load is imposed on the liner 53 as a result of gas filling after the operation of the fuel cell system 4 is stopped. Upon determining that a load is imposed on the liner, the controller limits the supply amount of hydrogen gas from the tank 30. Limitation of the supply amount enables a reduction in the speeds at which the temperature and pressure in the tank 30 lower (see FIGS. 4A and 4B). This is because even if hydrogen gas is emitted from the tank 30, the temperature lowers at a relatively low speed in conjunction with adiabatic expansion of hydrogen gas in the tank 30. The limitation of the supply amount allows the tank 30 to be easily warmed by the ambient air. Hence, the temperature and pressure in the tank 30 are restrained from decreasing, thus suppressing an increase in gap amount. This serves to reduce the amount by which the liner 53 expands during gas filling after the system is stopped. As a result, the liner 53 can be prevented from undergoing a heavy load.

Preferably, if rapid output is demanded to the fuel cell 28 as a result of, for example, WOT (Wide Open Throttle: full opening of a throttle valve) in he vehicle 3 while the supply amount of hydrogen gas is limited, the controller 46 inhibits an operation for meeting the demand. This allows the limitation of the supply amount to be reliably maintained, enabling a reduction in the load on the liner 53.

7-2. Second Example of Control

Now, a second example of control will be described with reference to FIG. 12, with focus placed on differences from the first example of control. The main difference lies in that the present control involves not only the calculation of the current gap amount (step S11) but also the calculation of the value of the gap amount predicted to be obtained a predetermined time later (step S14) and that the controller decides whether or not to limit the supply amount based on this predicted value (step S15). A block diagram of the controller 46 for implementing the present control is the same as that shown in FIG. 11.

Figure 12:
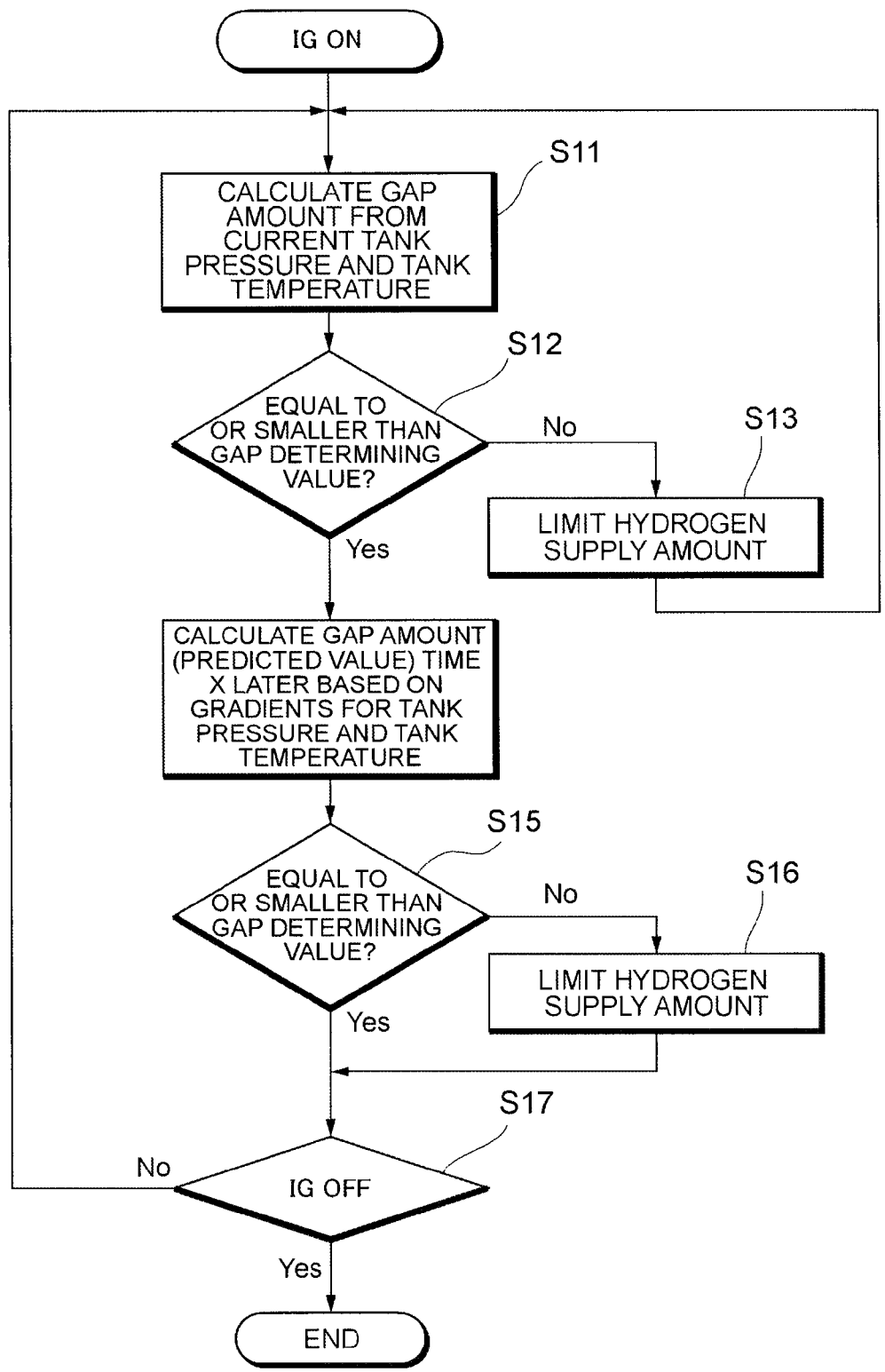
FIG. 12 is a flowchart illustrating a second example of control in the fuel cell system according to the embodiment.

As shown in FIG. 12, in step S11, the current gap amount 62 is calculated from the current tank pressure and tank temperature. In step S12, the required elongation $\epsilon$ is calculated based on the calculated current gap amount 62. The controller 46 then determines whether or not the calculated required elongation $\epsilon$ is equal to or smaller than the GAP determining value. Then, the controller 46 limits the supply amount of hydrogen gas (step S13) and subsequently calculates (step S11) and compares (step S12) the gap amount 62, until the required elongation $\epsilon$ is equal to or smaller than the GAP determining value (step S12; Yes).

On the other hand, if required elongation $\epsilon$ is equal to or smaller than the GAP determining value (step S12; Yes), the value of the gap amount 62 predicted to be obtained a time x (predetermined time) later is calculated based on the gradient of the tank pressure and the gradient of the tank temperature (step S14). This calculation is also carried out by the calculation section 71.

Figure 13A:
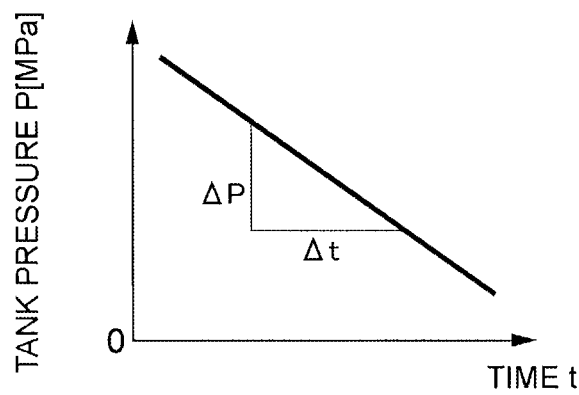
FIG. 13A is a diagram schematically illustrating the gradient of the tank pressure used in the second example of control in the fuel cell system according to the embodiment, the diagram illustrating a variation in tank pressure with respect to time during the supply of hydrogen gas.
Figure 13B:
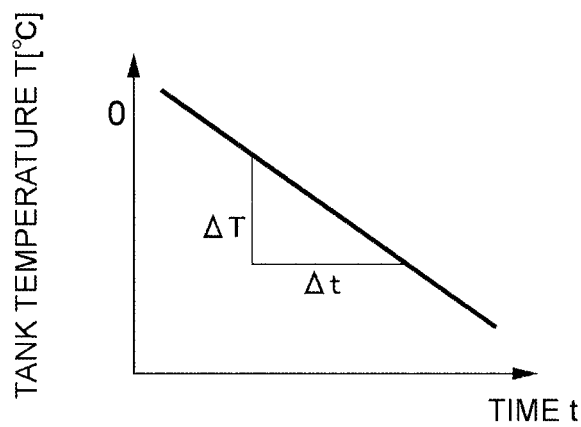
FIG. 13B is a diagram schematically illustrating the gradient of the tank temperature used in the second example of control in the fuel cell system according to the embodiment, the diagram illustrating a variation in tank temperature with respect to time during the supply of hydrogen gas.

Specifically, since both the tank pressure and the tank temperature lower as a result of the supply of hydrogen gas as shown in FIGS. 13A and 13B, the calculation section 71 first determines the gradient of the tank pressure ($\Delta P/\Delta t$) and the gradient of the tank temperature ($\Delta T/\Delta t$) per unit time. The calculation section 71 thus estimates the tank pressure and tank temperature obtained the time x later based on the gradients. Then, the calculation section 71 references the resultant estimated values in the map M to calculate the value of the gap amount 62 predicted to be obtained the time x later. In another embodiment, the calculation section 71 may determine the predicted value of the gap amount 62 based on the amount of variation other than that in the gradients of the tank pressure and the tank temperature. Furthermore, the time x can be set to any value, for example, five minutes.

In the next step S15, the decision section 72 calculates the elongation $\epsilon$ of the liner 53 required to close the gap 60 based on the predicted value of the gap amount 62. The decision section 72 then determines whether or not required elongation $\epsilon$ is equal to or smaller than the GAP determining value. At this time, the GAP determining value to be compared with the calculated required elongation $\epsilon$ corresponds to the tank temperature estimated in step S14 to be obtained the time x later.

If the determination indicates that the required elongation $\epsilon$ is equal to or smaller than the GAP determining value (step S15; Yes), the system carries out the normal supply of hydrogen gas and then waits for the ignition key to be turned off (step S17). On the other hand, if the required elongation $\epsilon$ is not equal to or smaller than the GAP determining value (step S15; Yes), the system limits the supply amount of hydrogen gas (step S16) and then waits for the ignition key to be turned off (step S17). The above-described steps S11 to S16 are repeated until the ignition key is turned off (step S17; Yes). Thus, even if the supply amount is initially not limited (step S12; Yes, step S15; Yes), when the elongation $\epsilon$ required for the gap amount 62 is greater than the GAP determining value, the supply amount is subsequently positively limited.

Here, the limitation of the supply amount in steps S13 and S16 can be carried out in the same manner as that in the above-described first example of control (step S4). The limitation amount by which the supply amount is limited may be the same for steps S13 and S16 but preferably differs between step S13 and step S16. Specifically, the limitation amount in step S13 may be larger than that in step S16. By way of example, the supply flow rate in step S13 may be lower than that in step S16.

On the other hand, the limitation amount in step S13 may be set smaller than that in step S4 in the first example of control. That is, if the supply amount is limited based on the current gap amount 62, the supply amount in step S13 in the second example of control may be larger than that in step S4 in the first example of control. This is because in the second example of control, the supply amount can also be limited in step S16.

The present example of control described above not only exerts advantageous effects similar to those of the first example of control but also enables the supply amount to be progressively limited compared to the first example of control. Thus, during acceleration of the vehicle 3, which involves heavy consumption of hydrogen gas, the amount of hydrogen gas consumed can be compensated for to some degree. This allows soothing of the feeling of the user driving the vehicle 3 that the acceleration of the vehicle 3 is rapidly suppressed.

7-3. Third Example of Control

Now, a third example of control will be described with reference to FIG. 14 to FIG. 17. In the third example of control, a criterion for what is called an out-of-gas condition is changed based on the gap amount 62 calculated during the operation of the fuel cell system 4.

Figure 14:
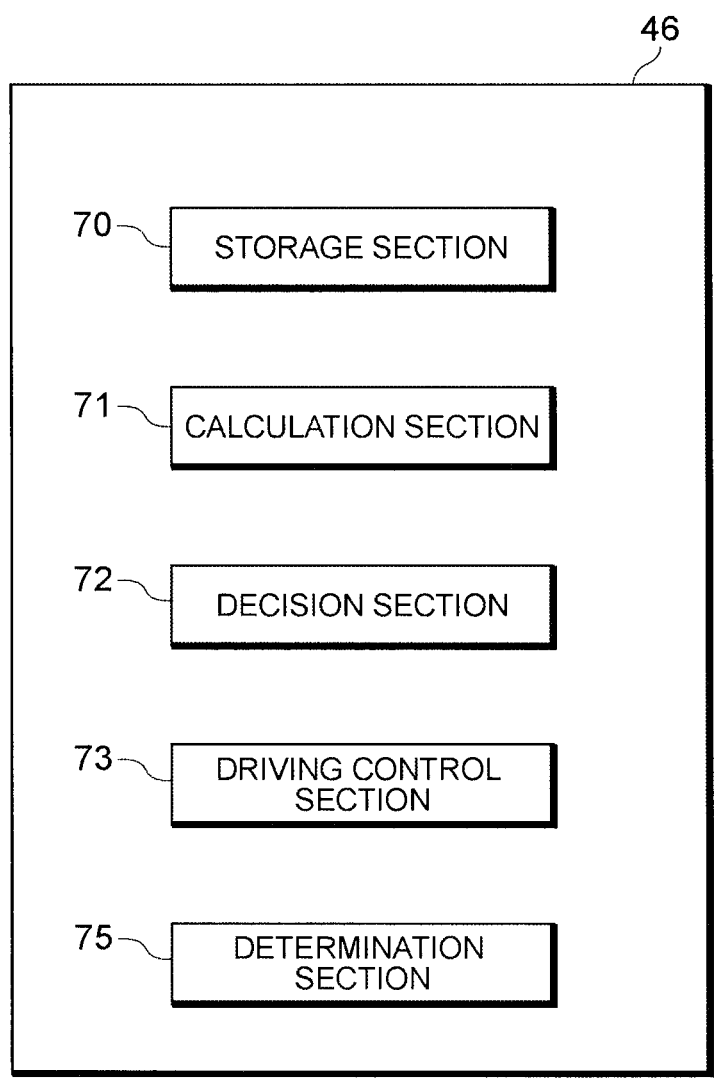
FIG. 14 is a diagram of functional blocks for implementing a third example of control in the fuel cell system according to the embodiment.

FIG. 14 is a block diagram showing the functional blocks of the controller 46 for implementing the control. The controller 46 includes a determination section 75 configured to determine whether or not the vehicle is out of gas, in addition to the above-described storage section 70, calculation section 71, decision section 72, and driving control section 73.

Figure 15A:
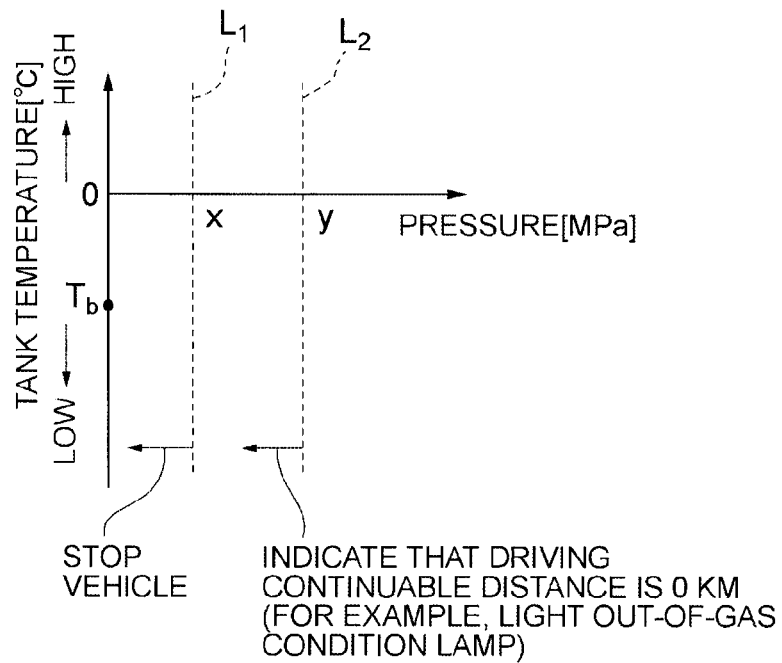
FIG. 15A is a diagram illustrating a method for determining an out-of-gas condition by comparing the tank pressure with criterion values according to a comparative example.
Figure 15B:
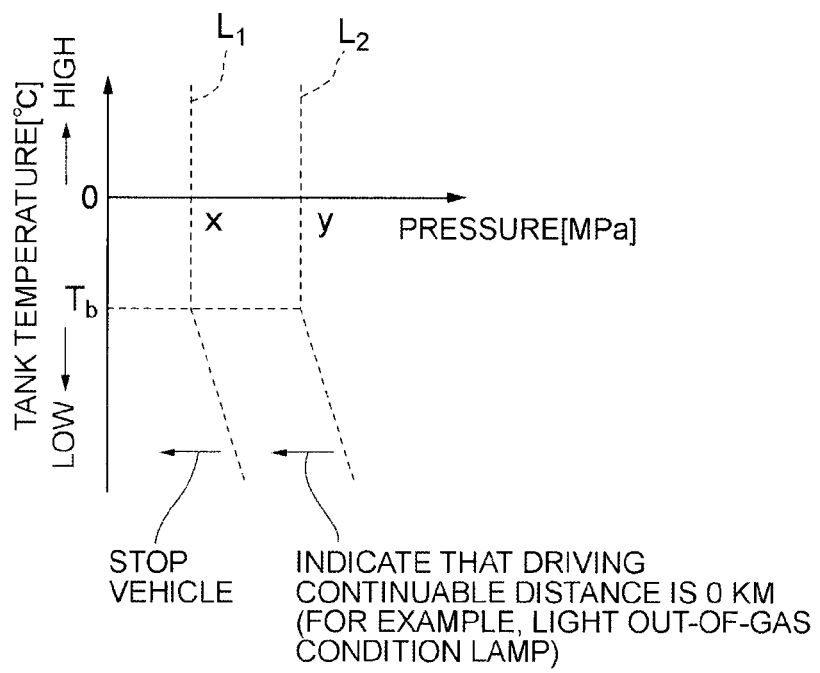
FIG. 15B is a diagram illustrating the method for determining the out-of-gas condition by comparing the tank pressure with the criterion values according to the third example of control.

FIGS. 15A and 15B illustrate methods for determining the out-of-gas condition according to a comparative example and the present example of control, respectively. In each of the methods, the out-of-gas condition is determined by comparing the tank pressure with criterion values.

Here, the criterion values for the out-of-gas condition determination, two out-of-gas condition lines $L_1$ and $L_2$ are used which indicate boundaries for the shortage of fuel gas in the tank 30 and for the possibility of the shortage. Specifically, the out-of-gas condition line $L_1$ is a tank pressure line corresponding to a boundary indicating whether or not the amount of hydrogen gas remaining in the tank 30 is exactly zero. When the value of the tank pressure is on the lower pressure side of the out-of-gas condition line $L_1$, the amount of hydrogen gas remaining in the tank 30 is exactly zero, the vehicle 3 is thus stopped. On the other hand, the out-of-gas condition line $L_2$ is a tank pressure line corresponding to a boundary indicating whether or not to indicate a driving continuable distance of the vehicle 3 is 0 km. When the value of the tank pressure is on the lower pressure side of the out-of-gas condition line $L_2$, the system indicates that the driving continuable distance is 0 km and urges the user such as the driver to fill hydrogen gas into the tank. Such indication is provided by the display device 42, typified by, for example, an out-of-gas condition lamp. If the value of the tank pressure is between the out-of-gas condition line $L_1$ and the out-of-gas condition line $L_2$, a small amount of hydrogen gas remains in the tank 30. Thus, the vehicle 3 can be continuously driven.

In the comparative example illustrated in FIG. 15A, the out-of-gas condition lines $L_1$ and $L_2$ are vertical straight lines passing through the values x and y, respectively, of the tank pressure. That is, the out-of-gas condition lines $L_1$ and $L_2$ are fixed regardless of the value of the tank temperature. In contrast, in the present example of control illustrated in FIG. 15B, the out-of-gas condition lines $L_1$ and $L_2$ are the same as those in the comparative example illustrated in FIG. 15A at a tank temperature Tb or higher. However, at the tank temperature Tb or lower, the out-of-gas condition lines $L_1$ and $L_2$ in the present example of control illustrated in FIG. 15B are inclined such that the tank pressures indicated by the lines $L_1$ and $L_2$ increase with decreasing tank temperature. That is, the gas lines $L_1$ and $L_2$ are set to indicate higher pressures when the tank temperature is equal to or lower than Tb than when the tank temperature is equal to or higher than Tb. The tank temperature Tb is at least less than 0° C., for example, −30° C.

Figure 16A:
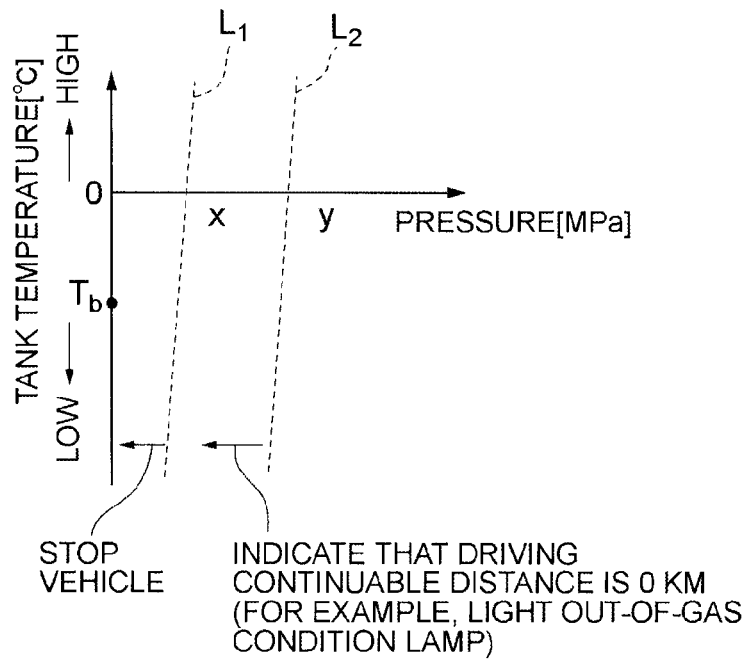
FIG. 16A is a diagram illustrating a method for determining the out-of-gas condition by comparing the amount of hydrogen gas remaining with criterion values according to the comparative example.
Figure 16B:
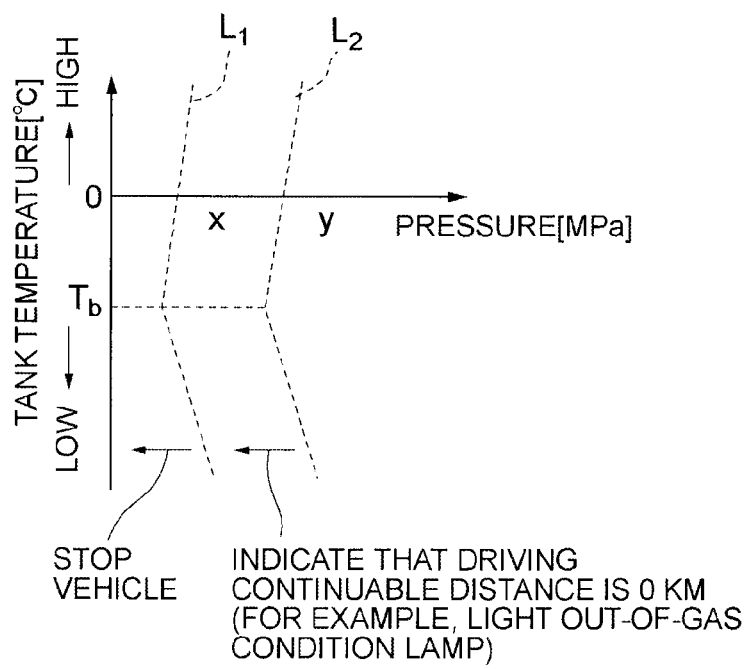
FIG. 16B is a diagram illustrating the method for determining the out-of-gas condition by comparing the amount of hydrogen gas remaining with the criterion values according to the third example of control.

FIGS. 16A and 16B illustrate another method for the out-of-gas condition determination and correspond to a comparative example and the present example of control, respectively. In this method, the out-of-gas condition is determined by comparing the amount of hydrogen gas in the tank 30 with criterion values.

Here, the amount n of hydrogen gas in the tank 30 can be calculated by a gas state equation and expressed by:

$$n = pV/zRT \qquad (3)$$

The meanings of the parameters are as follows:

P: the tank pressure,
V: the volume of the tank 30,
z: a compression coefficient,
R: a gas constant, and
T: the tank temperature.

Thus, the hydrogen gas amount n can be calculated from the tank pressure, the tank temperature, and the like.

Two out-of-gas condition lines $L_1$ and $L_2$ shown in FIGS. 16A and 16B indicate the hydrogen gas amount n. The out-of-gas condition line $L_1$ corresponds to the boundary indicating whether or not the amount of hydrogen gas remaining in the tank 30 is exactly zero. The out-of-gas condition line $L_2$ corresponds to the boundary indicating whether or not to indicate that the driving continuable distance of the vehicle 3 is 0 km. In the comparative example illustrated in FIG. 16A, the out-of-gas condition lines $L_1$ and $L_2$ are inclined straight lines passing through the values x and y, respectively, of the tank pressure. In the present example of control, the out-of-gas condition lines $L_1$ and $L_2$ are the same as those in the comparative example illustrated in FIG. 16A at the tank temperature Tb or higher. However, at the tank temperature Tb or lower, the out-of-gas condition lines $L_1$ and $L_2$ in the present example of control illustrated in FIG. 16B are inclined such that the tank pressures indicated by the lines $L_1$ and $L_2$ increase with decreasing tank temperature. That is, the out-of-gas condition lines $L_1$ and $L_2$ are set to indicate larger hydrogen gas amounts when the tank temperature is equal to or lower than Tb than when the tank temperature is equal to or higher than Tb.

As a state quantity for the hydrogen gas in the tank 30, a criterion other than the tank pressure and the amount of hydrogen gas in the tank 30 can be used to determine the out-of-gas condition. Furthermore, the out-of-gas condition line $L_2$ may correspond to a boundary indicating whether or not to display a predetermined distance (for example, 10 km) other than 0 km as the driving continuable distance of the vehicle 3.

Figure 17:
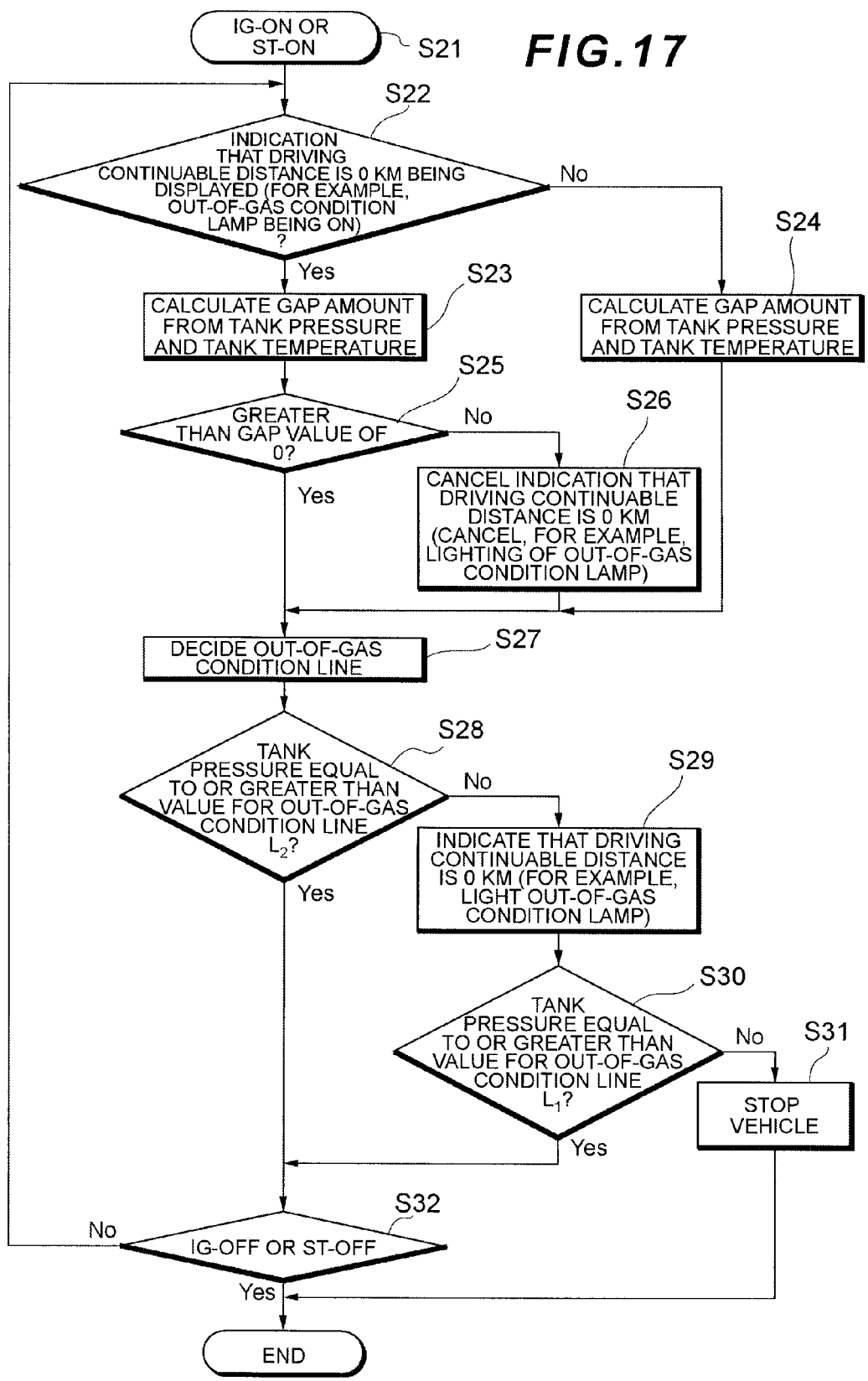
FIG. 17 is a flowchart illustrating the third example of control in the fuel cell system according to the embodiment.

FIG. 17 is a flowchart illustrating a third example of control.

First, the ignition key to the vehicle 3 is turned on as a trigger to start the operation of the fuel cell system 4 (step S21). Then, the system determines whether or not the display device 42 is showing that the driving continuable distance is 0 km (step S22). The current gap amount 62 is then calculated from the tank pressure and the tank temperature (steps S23 and S24). If the display device 42 is not showing that the driving continuable distance is 0 km (step S22; No), the current gap amount 62 is calculated (step S24), and the system proceeds to a process of deciding the out-of-gas condition lines (step S27).

If the display device 42 is showing that the driving continuable distance is 0 km (step S22; Yes), when the calculated current gap amount 62 is larger than zero (step S25; Yes), the system proceeds to the process of deciding the out-of-gas condition lines (step S27). When the calculated current gap amount 62 is zero (step S25; No), the system determines that the gap 60 has been closed to allow the tank 30 to be filled with hydrogen gas and cancels the above-described display (step S26). The system then proceeds to the process of deciding the out-of-gas condition lines (step S27).

In the process of deciding the out-of-gas condition lines (step S27), the determination section 75 decides the out-of-gas condition lines to be used for the out-of-gas condition determination based on the calculated gap amount 62. Specifically, the above-described required elongation $\epsilon$ is calculated from the calculated gap amount 62. If the calculated required elongation $\epsilon$ is equal to or smaller than the GAP determining value, the system decides to use the out-of-gas condition lines $L_1$ and $L_2$ shown in FIG. 15A or 16A. Otherwise (if the calculated required elongation $\epsilon$ is not equal to or smaller than the GAP determining value), the system decides to use the out-of-gas condition lines $L_1$ and $L_2$ shown in FIG. 15B or 16B.

Subsequently, the system monitors, as required, the tank pressure detected as required during the operation of the fuel cell system 4 or the amount n of hydrogen gas in the tank 30 calculated as required during the operation of the fuel cell system 4 to determine whether or not the tank pressure or the hydrogen gas amount n is equal to or larger than the value for the decided out-of-gas condition line $L_2$ (step S28). If the tank pressure or the hydrogen gas amount n is smaller than the value for the decided out-of-gas condition line $L_2$ (step S28; No), the display device 42 shows that the driving continuable distance is 0 km (step S29). If the display device 42 has already been showing this, step S29 is omitted. Subsequently, the system similarly monitors the tank pressure or hydrogen gas amount n acquired as required to determine whether or not the tank pressure or the hydrogen gas amount n is equal to or greater than the value for the decided out-of-gas condition line $L_1$ (step S30). If the tank pressure or the hydrogen gas amount n is smaller than the value for the decided out-of-gas condition line $L_1$ (step S30; No), the vehicle 3 is stopped (step S31). On the other hand, if the tank pressure or the hydrogen gas amount n is equal to or greater than the value for the decided out-of-gas condition line $L_1$ (step S30; Yes), the system returns to the above-described step S22 to carry out processing similar to that described above until the ignition key to the vehicle 3 is turned off (step S32; Yes).

The advantageous effects of the present example of control described above will be described.

If the required elongation $\epsilon$ calculated from the current gap amount 62 is not equal to or smaller than the GAP determining value during the operation of the fuel cell system 4, the criterion (out-of-gas condition lines $L_1$ and $L_2$) shown in FIG. 15B or FIG. 16B is used for the out-of-gas condition determination. When the tank temperature is equal to or lower than Tb which is equal to or lower than zero, this criterion allows the out-of-gas condition to be determined even at elevated tank pressure compared to the criterion (out-of-gas condition lines $L_1$ and $L_2$ shown in FIG. 15A or 16A) used if the required elongation $\epsilon$ is equal to or smaller than the GAP determining value.

That is, changing the criterion values for the out-of-gas condition determination allows the out-of-gas condition to be quickly determined if the required elongation $\epsilon$ is not equal to or smaller than the GAP determining value provided that the tank temperature is equal to or lower than Tb. In response to this determination, the out-of-gas condition is indicated, thus making the user such as the driver aware of the need for driving with the hydrogen consumption reduced. As a result, a decrease in the amount of hydrogen consumed by the fuel cell 28 reduces the amount of hydrogen fed from the tank 30 to the fuel cell 28. This suppresses an increase in gap amount 62. Hence, loads on the liner 53 can be reduced during gas filling after the fuel cell system 4 is stopped.

One of the out-of-gas condition lines $L_1$ and $L_2$ can be omitted. Furthermore, the third example of control may be combined with the above-described first example of control or second example of control. In this case, for example, when the out-of-gas condition lines are decided (step S27), the driving control section 73 limits the supply amount when the decision section 72 decides to limit the supply amount.

INDUSTRIAL APPLICABILITY

The fuel cell system, the method for supplying fuel gas in the fuel cell system, and the vehicle according to the present invention are applicable not only to hydrogen gas but also to other types of fuel gas such as natural gas. Furthermore, the fuel cell system, the method for supplying fuel gas in the fuel cell system, and the vehicle according to the present invention are applicable not only to vehicles but also to mobile bodies such as airplanes, ships, and robots which include a tank mounted therein and in which fuel gas is externally filled.

In the above-described embodiment, during the operation of the fuel cell system 4, the gap amount 62 is read from the map M to allow control to be performed. However, the system can be designed such that the above-described control is performed simply by acquiring information on the tank pressure and the tank temperature.

REFERENCE SIGNS LIST

2: gas station, 3: vehicle, 28: fuel cell, 30: tank, 36: pressure sensor, 38: temperature sensor, 53: liner, 55: reinforcement layer, 71: calculation section, 72: decision section, 73: driving control section, 75: determination section

The invention claimed is:

1. A fuel cell system comprising:
   a fuel cell;
   a tank for storing fuel gas, the tank comprising a liner and a reinforcement layer formed on an outer peripheral surface of the liner; and
   an adjustment device configured to adjust a supply amount of fuel gas to be fed from the tank to the fuel cell, the fuel cell system further comprising:
   an information acquisition section configured to acquire information on a pressure and a temperature in the tank;
   a calculation section configured to calculate a gap amount between the liner and the reinforcement layer based on information acquired by the information acquisition section during operation of the fuel cell system; and
   a decision section configured to decide whether or not to limit the supply amount based on the calculated gap amount.

2. The fuel cell system according to claim 1, wherein the calculation section also calculates a predicted value for the gap amount predicted to be obtained a predetermined time later, based on an amount of variation in the temperature in the tank and an amount of variation in the pressure therein during the operation of the fuel cell system, and the decision section decides whether or not to limit the supply amount also based on the predicted value.

3. The fuel cell system according to claim 1, further comprising:

a determination section configured to compare a state quantity for the fuel gas in the tank with a predetermined criterion value and to determine at least one of a shortage of the fuel gas in the tank and a possibility of the shortage; and a display section configured to indicate at least one of the shortage of the fuel gas in the tank and the possibility of the shortage when the determination section has made the determination, wherein the determination section changes the predetermined criterion value based on the calculated gap amount.

4. The fuel cell system according to claim 3, wherein the state quantity is the pressure in the tank, and the predetermined criterion value relates to the pressure.

5. The fuel cell system according to claim 4, wherein the determination section changes the predetermined criterion value to a higher pressure side when an elongation of the liner needed to zero the calculated gap amount is greater than a predetermined threshold compared to when the elongation is not greater than the predetermined threshold, provided that the temperature in the tank is at least lower than 0° C.

6. The fuel cell system according to claim 3, wherein the state quantity is the amount of fuel gas in the tank, and the predetermined criterion value relates to the fuel gas amount.

7. The fuel cell system according to claim 6, wherein the determination section changes the predetermined criterion value to a larger amount side when an elongation of the liner needed to zero the calculated gap amount is greater than a predetermined threshold compared to when the elongation is not greater than the predetermined threshold, provided that the temperature in the tank is at least lower than 0° C.

8. The fuel cell system according to claim 6, wherein the determination section calculates the fuel gas amount to be compared with the predetermined criterion value, based on information on the pressure and temperature in the tank acquired by the information acquisition section during operation of the fuel cell system.

9. The fuel cell system according to claim 1, wherein the decision section calculates an elongation of the liner needed to zero the calculated gap amount, and decides to limit the supply amount when the calculated elongation is greater than a predetermined threshold compared to when the calculated elongation is not greater than the predetermined threshold.

10. The fuel cell system according to claim 9, wherein the predetermined threshold is breaking elongation of the liner and varies depending on the temperature in the tank.

11. The fuel cell system according to claim 1, wherein when the decision section decides to limit the supply amount, the adjustment device limits the supply amount by carrying out one of zeroing of the supply amount, reduction of a maximum value of a supply flow rate of fuel gas to be supplied to the fuel cell, and reduction of the supply flow rate.

12. A mobile body comprising the fuel cell system according to claim 1, wherein the tank is configured such that fuel gas from a gas station located outside the mobile body can be filled into the tank.

13. A method for supplying fuel gas in a fuel cell system comprising a tank including a liner and a reinforcement layer formed on an outer peripheral surface of the liner, and a fuel cell to which fuel gas from the tank is supplied, the method comprising the steps of:

calculating a gap amount between the liner and the reinforcement layer based on information on a pressure and a temperature in the tank acquired during operation of the fuel cell system;

determining whether or not an elongation of the liner needed to zero the calculated gap amount is greater than a predetermined threshold; and limiting a supply amount of fuel gas to be fed from the tank to the fuel cell when the elongation is determined to be greater than the predetermined threshold compared to when the elongation is not determined to be greater than the predetermined threshold.

\* \* \* \* \*